United States Patent
Eytan et al.

(10) Patent No.: US 12,038,672 B2
(45) Date of Patent: Jul. 16, 2024

(54) SYSTEMS AND METHODS FOR FLANGE FOCAL LENGTH DISTRIBUTION

(71) Applicant: Mobileye Vision Technologies Ltd., Jerusalem (IL)

(72) Inventors: Ori Eytan, Jerusalem (IL); Dan Alon, Mitzpe Yiricho (IL); Shimon Davino, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 179 days.

(21) Appl. No.: 17/292,605

(22) PCT Filed: Sep. 13, 2019

(86) PCT No.: PCT/IB2019/001047
§ 371 (c)(1),
(2) Date: May 10, 2021

(87) PCT Pub. No.: WO2020/099920
PCT Pub. Date: May 22, 2020

(65) Prior Publication Data
US 2022/0004086 A1    Jan. 6, 2022

Related U.S. Application Data

(60) Provisional application No. 62/899,251, filed on Sep. 12, 2019, provisional application No. 62/767,799, filed on Nov. 15, 2018.

(51) Int. Cl.
*G02B 7/02*   (2021.01)
*G03B 13/30*  (2021.01)
(Continued)

(52) U.S. Cl.
CPC ............. *G03B 17/14* (2013.01); *G02B 7/025* (2013.01); *G03B 13/30* (2013.01); *H04N 23/67* (2023.01)

(58) Field of Classification Search
CPC ............................... H04N 23/67; G02B 7/025
(Continued)

(56) References Cited

U.S. PATENT DOCUMENTS

2009/0256951 A1   10/2009  Yumiki
2010/0110270 A1   5/2010   Sekimoto et al.
(Continued)

FOREIGN PATENT DOCUMENTS

CN           1637582        7/2005
CN          101324678      12/2008
(Continued)

OTHER PUBLICATIONS

"International Application Serial No. PCT IB2019 001047, International Preliminary Report on Patentability mailed May 27, 2021", 8 pgs.
(Continued)

*Primary Examiner* — Joel W Fosselman
(74) *Attorney, Agent, or Firm* — Schwegman Lundberg & Woessner, P.A.

(57) ABSTRACT

Systems and methods described herein can be used to improve camera modules (e.g., camera components), particularly when the camera lens depth of focus is very small. Improvement of a camera with a small depth of focus is particularly important in various applications, such as in cameras used in autonomous navigation (e.g., advanced driver assistance systems (ADAS) and autonomous vehicle (AV) systems).

20 Claims, 8 Drawing Sheets

(51) Int. Cl.
  *G03B 17/14* (2021.01)
  *H04N 23/67* (2023.01)
(58) Field of Classification Search
  USPC .......................................................... 348/349
  See application file for complete search history.

(56) References Cited

U.S. PATENT DOCUMENTS

| | | | |
|---|---|---|---|
| 2010/0322610 | A1 | 12/2010 | Lusinchi |
| 2012/0019940 | A1* | 1/2012 | Lu .................... H01L 27/14618 |
| | | | 359/819 |

FOREIGN PATENT DOCUMENTS

| | | |
|---|---|---|
| CN | 101542348 A | 9/2009 |
| CN | 102449524 | 5/2012 |
| CN | 104243786 A | 12/2014 |
| CN | 206321852 | 7/2017 |
| CN | 113490882 | 10/2021 |
| JP | 2006227324 A | 8/2006 |
| JP | 2014127930 A | 7/2014 |
| JP | 2019113711 A | 7/2019 |
| KR | 20170025759 A | 3/2017 |
| KR | 20180085550 | 7/2018 |
| WO | WO-2020099920 A1 | 5/2020 |

OTHER PUBLICATIONS

"Chinese Application Serial No. 201980075539.4, Response filed Dec. 21, 2022 to Office Action mailed Jun. 6, 2022", w English claims, 9 pgs.

"European Application Serial No. 19798710.0, Communication Pursuant to Article 94(3) EPC mailed Dec. 22, 2022", 6 pgs.

"International Application Serial No. PCT/IB2019/001047, International Search Report mailed Feb. 12, 2020", 4 pgs.

"International Application Serial No. PCT/IB2019/001047, Written Opinion mailed Feb. 12, 2020", 8 pgs.

"Chinese Application Serial No. 201980075539.4, Office Action mailed Jun. 6, 2022", w English Translation, 18 pgs.

"Chinese Application Serial No. 201980075539.4, Decision of Rejection mailed Apr. 7, 2023", w/ English Translation, 21 pgs.

"European Application Serial No. 19798710.0, Response filed Jul. 3, 2023 to Communication Pursuant to Article 94(3) EPC mailed Dec. 22, 2022", 24 pgs.

"Chinese Application Serial No. 201980075539.4, Response filed Jul. 24, 2023 to Decision of Rejection mailed Apr. 7, 2023", w English claims, 45 pgs.

"Chinese Application Serial No. 201980075539.4, Office Action mailed Dec. 5, 2023", w/ English Translation, 11 pgs.

* cited by examiner

SECTION A-A
FIG. 2

SYSTEMS AND METHODS FOR FLANGE FOCAL LENGTH DISTRIBUTION

CLAIM OF PRIORITY

This patent application is a U.S. National Stage Filing under 35 U.S.C. 371 from International Application No. PCT/IB2019/001047, filed on Sep. 13, 2019, and published as WO 2020/099920 on May 22, 2020, which claims the benefit of priority, under 35 U.S.C. Section 119(e), to Ori Eytan U.S. Patent Application Ser. No. 62/767,799, entitled "SYSTEMS AND METHODS FOR FLANGE FOCAL LENGTH DISTRIBUTION," filed on Nov. 15, 2018, and claims the benefit of priority, under 35 U.S.C. Section 119(e), to Ori Eytan U.S. Patent Application Ser. No. 62/899,251, entitled "SYSTEMS AND METHODS FOR FLANGE FOCAL LENGTH DISTRIBUTION," filed on Sep. 12, 2019, each of which is hereby incorporated by reference herein in its entirety.

BACKGROUND

Mass production of image capture devices (e.g., cameras) includes manufacturing and alignment of various image capture device components. As cameras increase in resolution, improved manufacturing and alignment of camera components will improve camera performance and reliability.

SUMMARY

Systems and methods described herein can be used to improve camera modules (e.g., camera components), particularly when the camera lens depth of focus is very small. Improvement of a camera with a small depth of focus is particularly important in various applications, such as in cameras used in autonomous navigation (e.g., advanced driver assistance systems (ADAS) and autonomous vehicle (AV) systems).

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description may be not limited to the disclosed embodiments and examples.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1A:
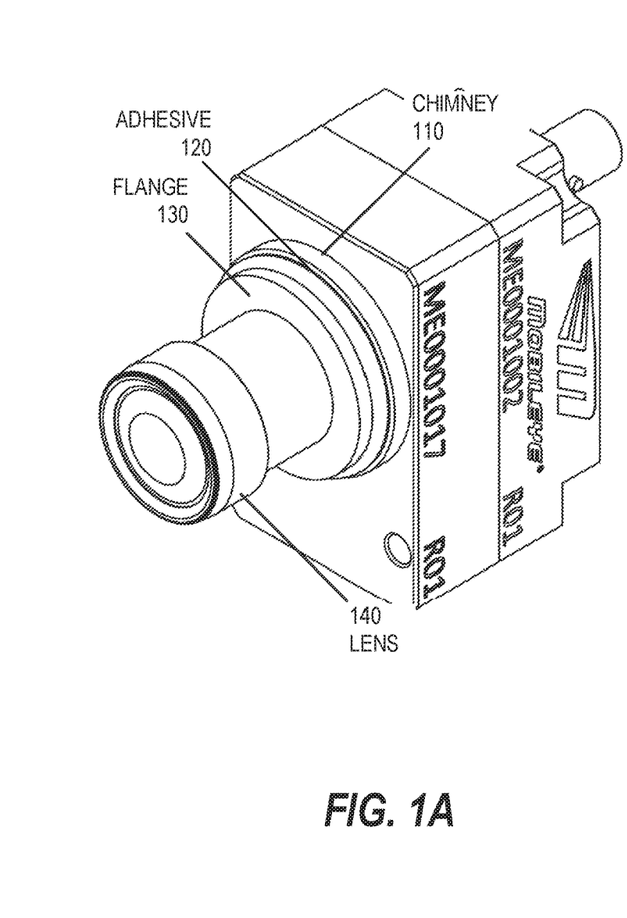
FIGS. 1A-1C are diagrams of an image capture device consistent with the disclosed embodiments.
Figure 1B:
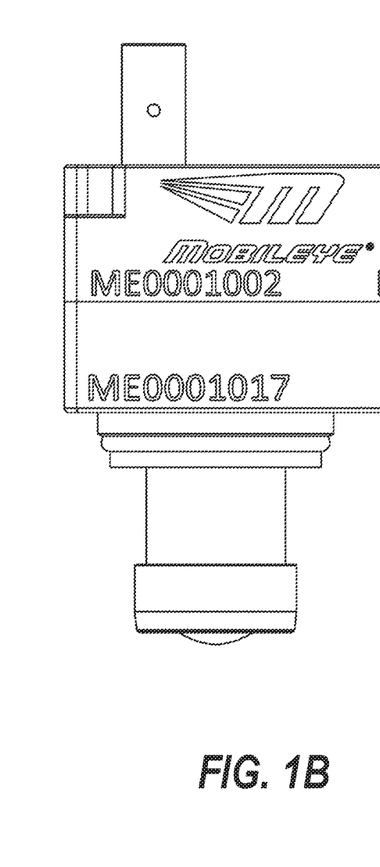
Figure 1C:
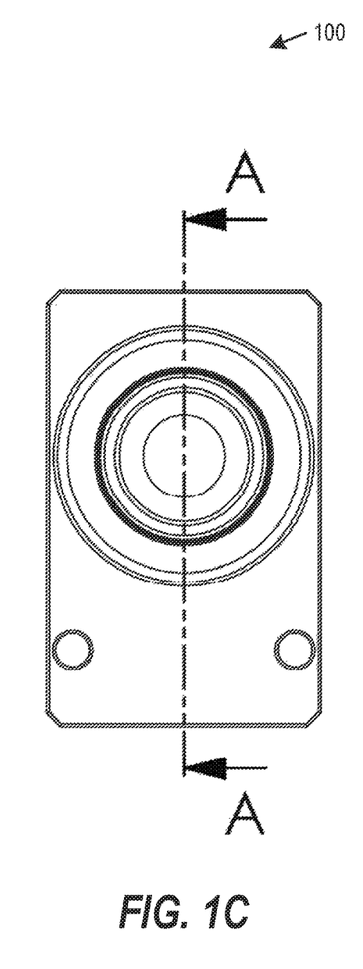

FIGS. 1A-1C are diagrams of an image capture device 100 consistent with the disclosed embodiments. FIG. 1A shows a chimney 110 that forms part of the housing of the image capture device 100. An adhesive 120 (e.g., glue) may be disposed within the chimney 110, and a lens flange 130 may rest against the adhesive 120. FIG. 1B shows a top view of image capture device 100, and FIG. 1C shows a front view of image capture device 100. FIG. 1C shows a "A-A" cross-section, which corresponds to a cross-sectional view of image capture device as shown in FIG. 2.

Figure 2:
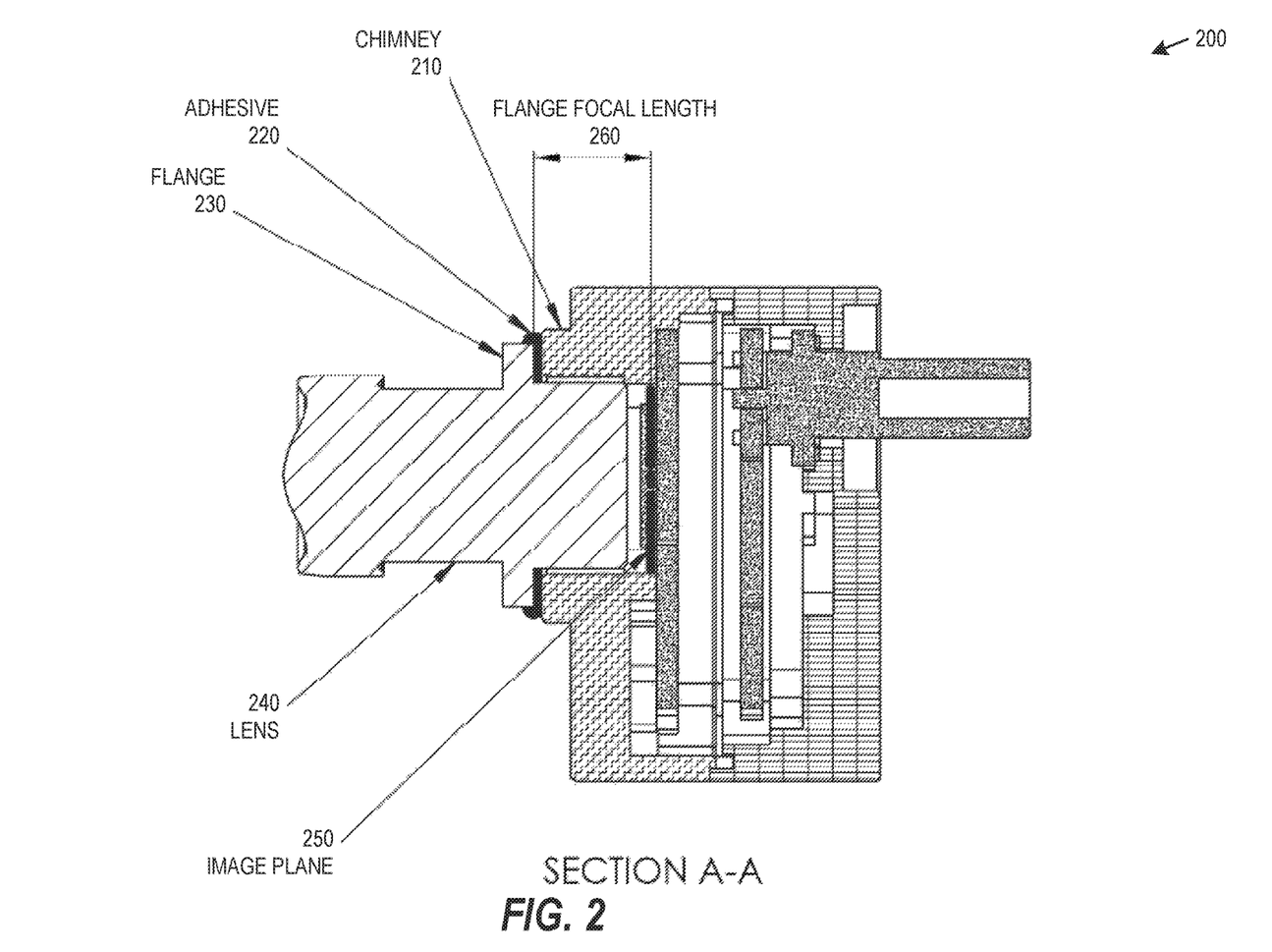
FIG. 2 is a diagram of an image capture device consistent with the disclosed embodiments.

FIG. 2 is a diagram of an image capture device 200 consistent with the disclosed embodiments. FIG. 2 shows a cross-sectional view of image capture device 200, which may be cut in the "A-A" cross-section shown in FIG. 1C. FIG. 2 shows the chimney 210 that forms part of the housing. The adhesive 220 may be disposed within the chimney 210, and the lens flange 230 may rest against the adhesive 220. The lens 240 may extend within the image capture device 200, and the lens flange 230 may be used to fix the distance that the lens 240 extends within the image capture device 200. The image capture device 200 may include an image plane 250 (e.g., film plane), which may describe the plane of the imaging sensor. The imaging sensor may include an active pixel sensor, a semiconductor charge-coupled device (CCD), or other imaging sensor. The flange focal length 260 (FFL) may describe the distance between an inner surface of the lens flange 230 and the image plane 250, where the image plane describes the plane where the image is captured (e.g., an outer surface of an image sensor). The flange focal length 260 may be referred to as a flange focal depth, a flange focal length, a flange-to-film distance, a flange focal distance, or a flange back distance.

The flange focal length 260 may have an associated flange focal length range (e.g., tolerance) known as the depth of focus, where the depth of focus describes an upper and lower bound in the variation of the flange focal length 260. In applications where the depth of focus is very small, manufacture of the image capture device 200 may be improved using active alignment of the relative position of the image plane 250 and the lens 240 to identify a relative position that improves or maximizes the performance of the image capture device. After finding the relative position, a fixing process is applied, which includes adjusting and fixing image plane 250 (e.g., adjusting the image sensor). The fixing process may include curing adhesive 220, such as curing adhesive 220 using UV light, baking adhesive 220 in a curing oven, or other curing methods. The curing of the adhesive 220 typically results in a reduction in size (e.g., shrinkage) of the adhesive 220.

The shrinkage may be pre-compensated by shifting the image plane 250 in an opposite distance from the expected shrinkage. This pre-compensation modifies the lens-sensor relative position to provide high optical quality following adhesive curing. However, even when pre-compensated, the adhesive shrinkage amount may vary, which may cause alignment errors in the lens-sensor final fixed relative position. The effect of the adhesive shrinkage variations depends on the lens depth of focus. For example, when the shrinkage variations are small relative to the lens' depth of focus, then the fixed image capture components provide improved optical quality. Conversely, when the shrinkage variations are not small relative to the lens' depth of focus, then the fixed manufactured modules have variable optical quality, which may affect camera performance or camera manufacturing production yield.

The magnitude of the shrinkage variation may be affected by the thickness of the adhesive 220. In particular, the thicker the adhesive 220, the greater the shrinkage variations. The thickness of the adhesive 220 may be determined by the size of the gap between flange 230 and chimney 210 (e.g., adhesive gap). The adhesive gap may be limited from below by the distribution (e.g., variation tolerances) of the flange focal length 260. The adhesive gap may be selected to provide improved camera focusing even in extreme cases of very small lens flange focal length. For a large flange focal length 260, the adhesive thickness, adhesive thickness variation, and shrinkage variation will be relatively large. As a result, this careful selection of the adhesive gap improves performance of cameras with a large flange focal length 260 and a small depth of focus, such as in cameras used in autonomous navigation.

Figure 3:
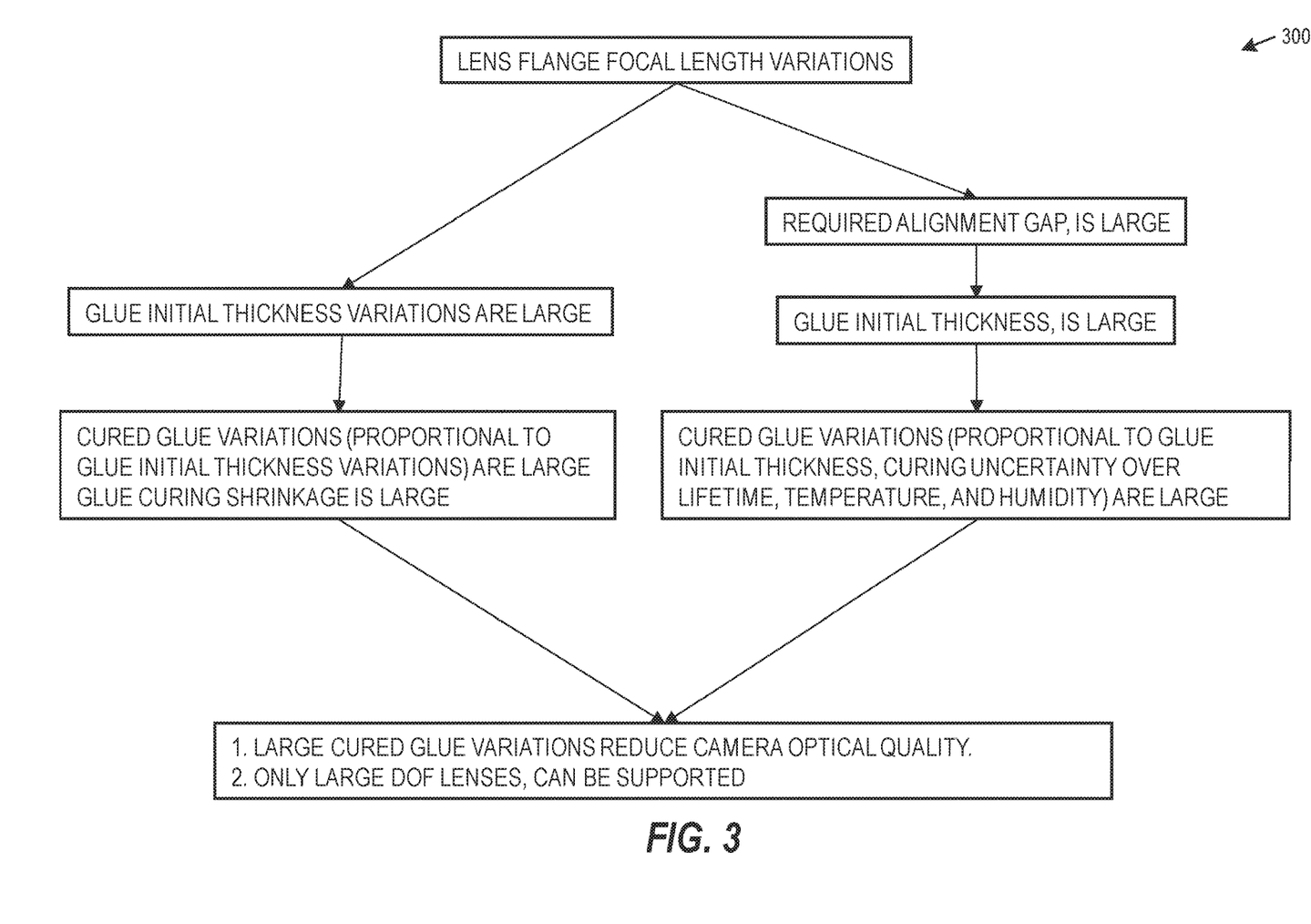
FIG. 3 is a block diagram representation of a method consistent with the disclosed embodiments.

FIG. 3 is a block diagram representation of lens flange focal length variations 300 consistent with the disclosed embodiments. When glue (e.g., adhesive) initial thickness variations are large, the cured glue variations may be proportional to glue initial thickness variations, and the glue curing shrinkage may be large. When the required alignment gap is large and the glue initial thickness is large, the cured glue variations may be large, including glue variations that are proportional to the glue initial thickness, curing uncertainty, glue thickness over lifetime, glue thickness based on temperature, glue thickness based on humidity, and other glue thickness variations. As a result, large cured glue variations may reduce camera optical quality, which may limit the applications to lenses with relatively large depths of focus.

Figure 4:
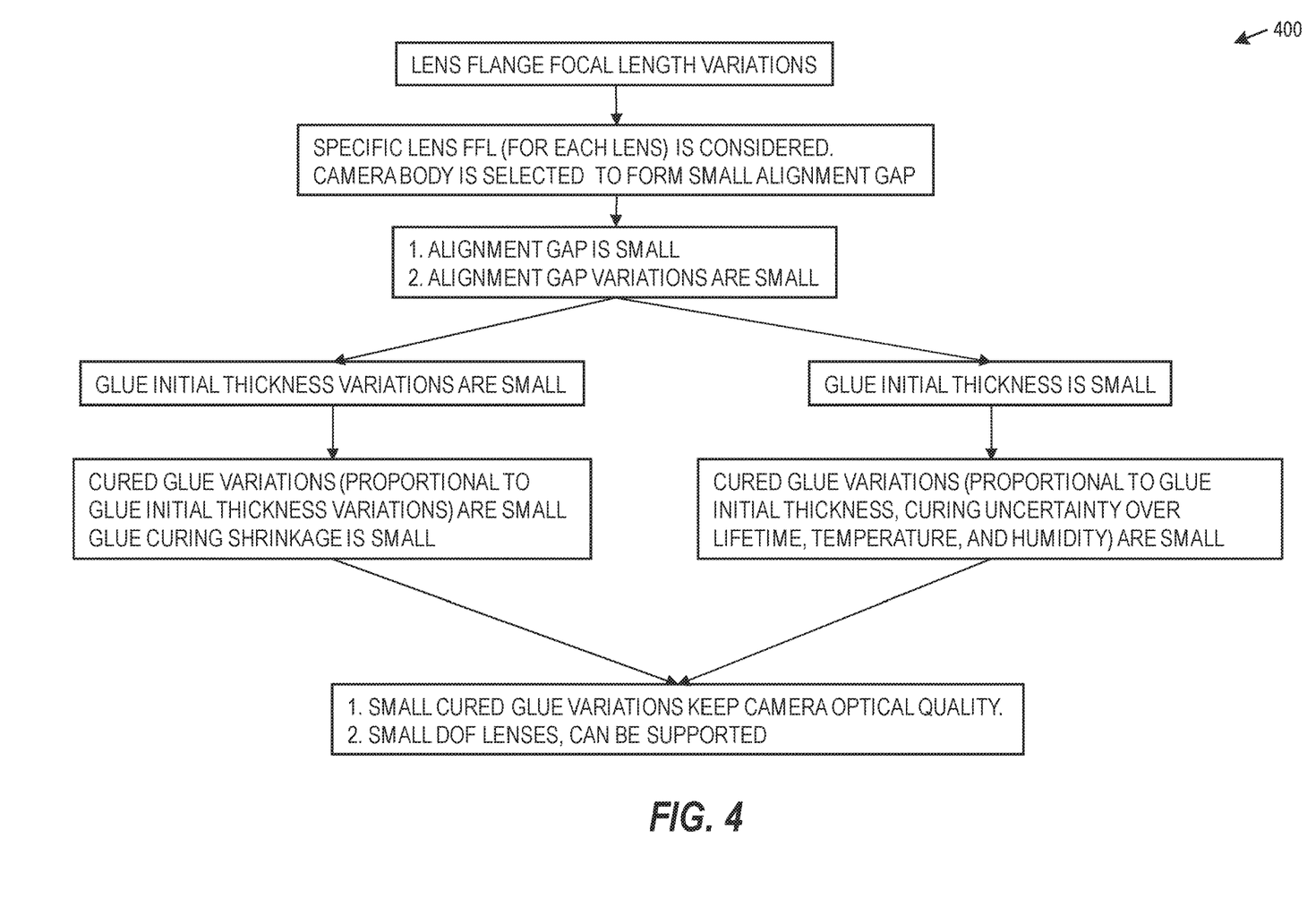
FIG. 4 is a block diagram representation of a method consistent with the disclosed embodiments.

FIG. 4 is a block diagram representation of lens flange focal length variations 400 consistent with the disclosed embodiments. A specific lens flange focal length may be considered based on the optical properties of each lens, and the camera body may be selected to reduce or minimize the alignment gap. Reducing or minimizing the alignment gap provides a reduction or minimization in the alignment gap variation. When the glue initial thickness variations are small, the cured glue variations are proportional to the glue initial thickness variations, and the glue curing shrinkage may be small. When the glue initial thickness is small, the cured glue variations may be small, including glue variations that are proportional to the glue initial thickness, curing uncertainty, glue thickness over lifetime, glue thickness based on temperature, glue thickness based on humidity, and other glue thickness variations. As a result, small cured glue variations may improve camera optical quality, which may provide the ability to use lenses with relatively small depths of focus. This may provide improved performance of cameras with a large flange focal length and a small depth of focus.

Figures 5A, 5B:
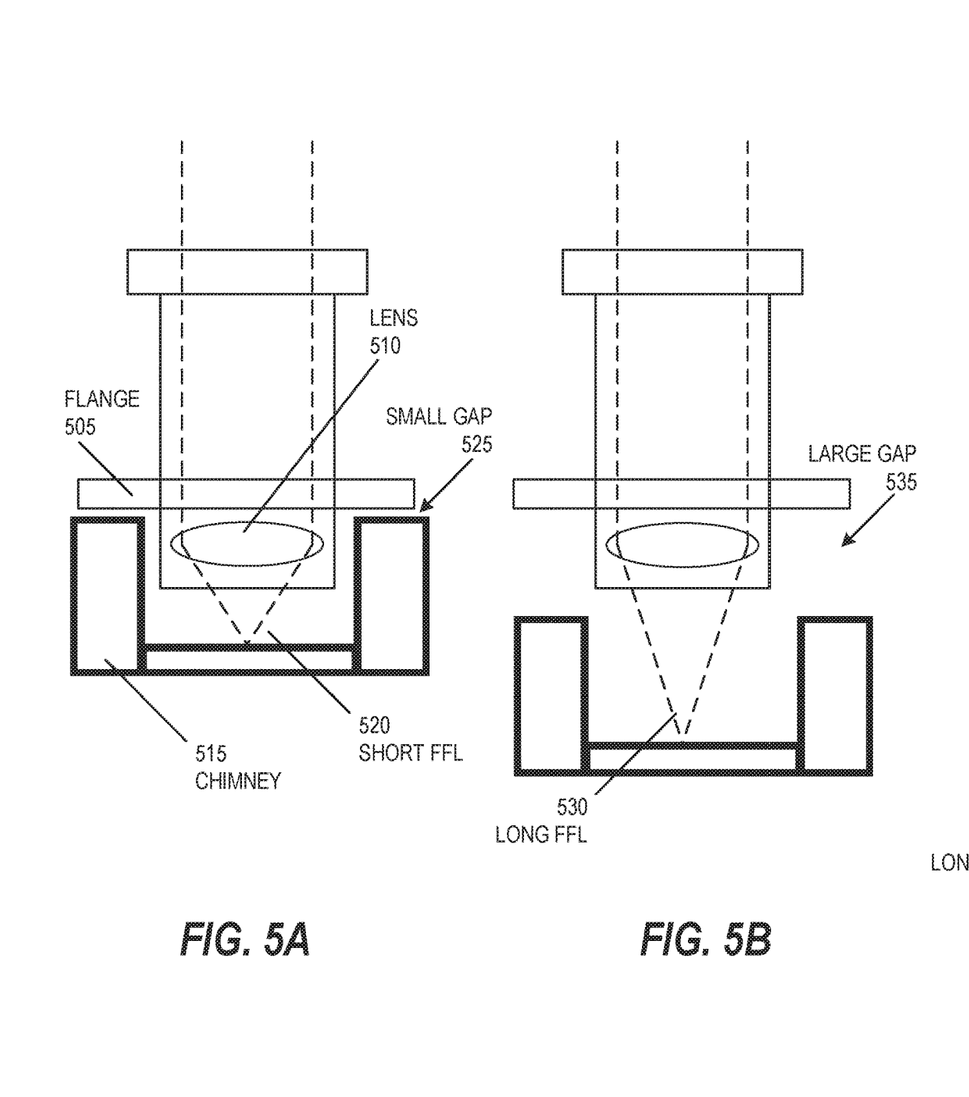
FIGS. 5A-5C are diagrams of image capture device components consistent with the disclosed embodiments.
Figure 5C:
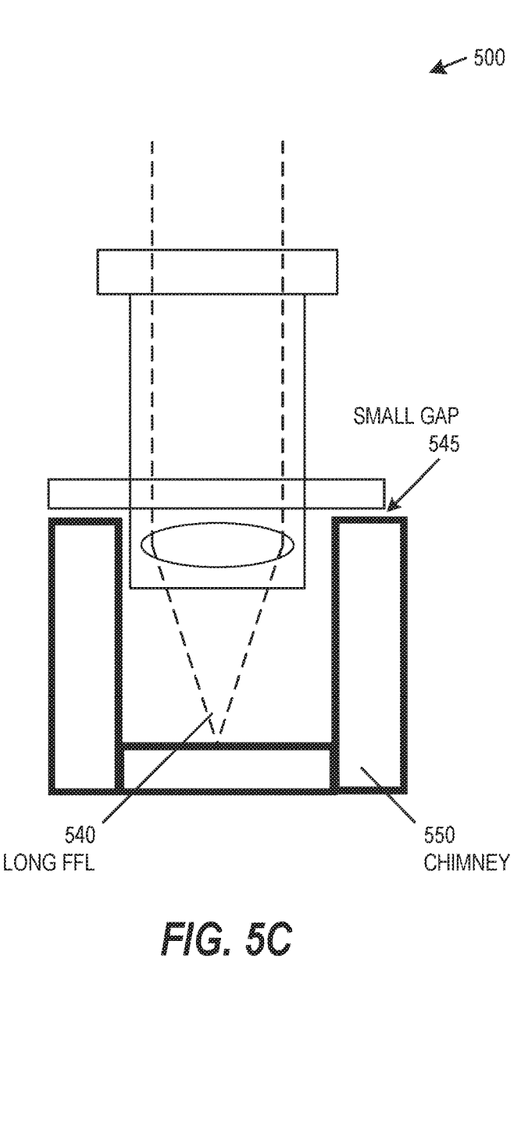

FIGS. 5A-5C are diagrams of image capture device components 500 consistent with the disclosed embodiments. FIG. 5A shows a first lens flange 505 and chimney 515 within a camera, where this camera has a lens 510 that focuses light to associated short flange focal length 520 and small adhesive gap 525. In contrast, FIG. 5B shows a camera with an associated long flange focal length 530 and large adhesive gap 535. The large adhesive gap 535 may result in adhesive shrinkage variations, which results in reduced camera performance and reduced camera manufacturing production yield. FIG. 5C shows a camera with a long flange focal length 540 and a reduced adhesive gap 545 (e.g., reduced relative to the camera in FIG. 5B). As shown in FIG. 5C, the reduction in adhesive gap 545 may be provided by selecting the height of the chimney 550 to minimize the adhesive gap 545 while providing the desired flange focal length 540. For manufacturing cameras of relatively small lens depth of focus at high optical quality, multiple variants of the camera housing may be generated. The variants of the camera housing may have varying chimney height, and may be selected based on the flange focal length of the camera. The flange focal length of the camera may be determined during manufacturing at the end-of-line test, and the camera housing variant may be selected based on the determined flange focal length. The camera housing variant may be selected to provide an adhesive gap that is both as small as possible for minimizing shrinkage variations, yet large enough to allow active alignment. This may provide improved performance of cameras with a large flange focal length and a small depth of focus, such as in cameras used in autonomous navigation.

In an example, the image capture device components has an associated effective focal length of 6 mm, and an associated flange focal length of 8 mm. The tolerance of the flange focal length is +/−0.2 mm (e.g., total range 0.4 mm). The tolerance of the given angular lens barrel to optical axis is 0.5 degrees, and the flange diameter is 15 mm, which suggests a gap requirement of 15 mm/2*tan(0.5 deg)=0.065 mm. The total gap required by tolerances is therefore 0.465 mm. In such a case the minimal gap will be 0.465+additional gap needed for alignment, such as a glue thickness 0.5 mm. This leads to glue cured variations of ~+/−5 um. The matching of the chimney based on the specific lens may compensate for flange focal length tolerance and reduce the Glue thickness to ~0.1 mm. The glue cured variations will be ~+/−1 um, which provides significant improvement in camera performance and camera manufacturing production yield.

Figure 6:
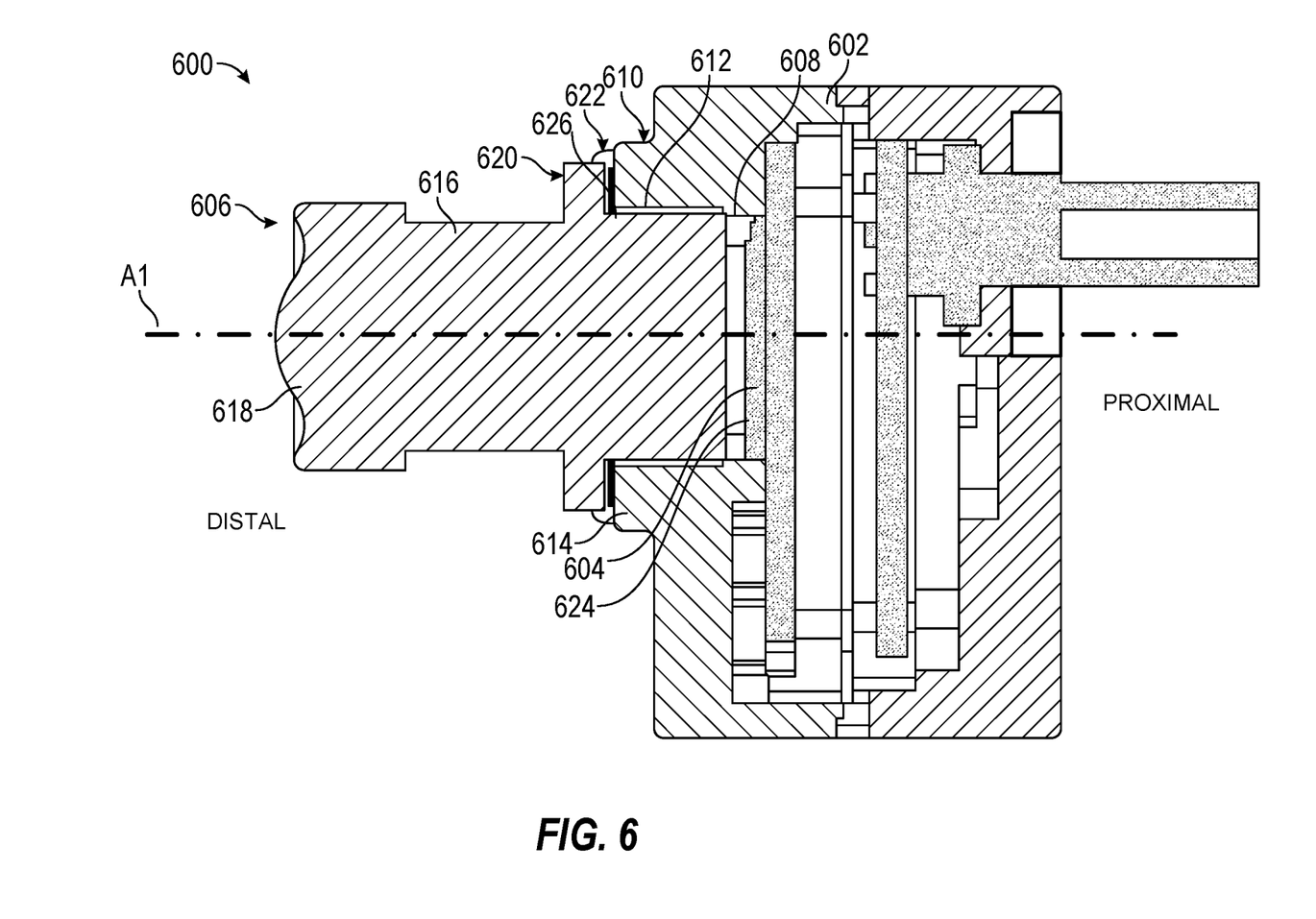
FIG. 6 is a cross-sectional view of an image capture device consistent with the disclosed embodiments.

FIG. 6 illustrates a cross-sectional view of a camera module 600, in accordance with at least one example of this disclosure. The camera module 600 can include a body 602, an image capture sensor 604, and a lens assembly 606. The body 602 can include a cavity 608 and a chimney 610. The chimney 610 can include a chimney bore 612 and a distal portion 614. The lens assembly 606 can include a lens barrel 616, an optical part 618 (or optical parts 618 or optical device 618), and a flange 620. The camera module 600 can also include adhesive (or glue) 622, and a spacer 626. FIG. 6 also shows orientation indicators Proximal and Distal and Axis A1.

The body 602 can be a rigid or semi-rigid body comprised of materials such as one or more of metals, plastics, foams, elastomers, ceramics, composites, combinations thereof, or the like. The body 602 can be sized and shaped to be mounted to a machine (such as a vehicle), in some examples, or can be sized and shaped to be handheld, in other examples. The cavity 608 can be a cavity within the body 602 sized and shaped to receive and support one or more components therein, such as the image capture sensor 604.

The chimney 610 can be a portion of the body 602 extending distally from the body 602 and can include a chimney bore 612 extending through the chimney 610 and connected to the cavity 608. The chimney 610 can be generally cylindrical in shape and the chimney bore 612 can be sized to receive a portion of the lens assembly 606 therein to connect the lens assembly 606 to the body 602. The distal portion 614 of the chimney 610 can be sized and shaped to engage with the flange 620 of the lens assembly 606 and can be configured to receive the adhesive 622 thereon to secure the lens assembly 606 to the body 602.

The image capture sensor 604 can include an image plane 624 (e.g., film plane), which can be a plane of the imaging sensor. The image capture sensor 604 can include an active pixel sensor, a semiconductor charge-coupled device (CCD), a CMOS image sensor, or other imaging sensor configured to produce a signal based on an image projected onto the image capture sensor 604. The image capture sensor 604 can be positioned within the body 602 near the chimney 610 (axial below the chimney), but can be connected to other parts of the body 602 and can be external to the body 602 in some examples. In some examples, the image capture sensor 604 can be connected to an integrated circuit board configured to support and electrically connect components, including transistors and circuits of any of multiple forms known in the industry, providing conductive structures and contacts to distribute signals.

The lens assembly 606 can be a device configured to engage the body 602 and can be configured to provide a focused image to the image sensor 604. The lens barrel 616 can be a rigid or semi-rigid body comprised of materials such as one or more of metals, plastics, foams, elastomers, ceramics, composites, or the like. The lens barrel 616 can be substantially cylindrical and can have a dimension (e.g., a diameter) sized for insertion into the chimney bore 612 of the chimney. The optical part or parts 618 can be fixed within the lens barrel 616 and can be made of one or more optical materials such as glass, plastic, or other materials that are light transmitting and optically active for the wavelength band that is used by the camera module 600. The lens optical parts 618 can include one or more optical elements, such as fixed-focal-length lenses, a focal zoom system, combiner lenses, or the like.

The flange 620 can be a flange connected to the barrel 616 and extending radially outward therefrom. The flange 620 can be positioned between proximal and distal ends of the lens barrel 616. The flange 620 can be sized and shaped to be secured to the distal portion 614 of the chimney 610, such as by using adhesive (or glue) 622.

The adhesive 622 can be any suitable resin, which can be one or more resins chosen from an epoxy resin, an acrylic resin, an acrylate resin, a cyanoacrylate resin, cyano-urethane resin, a polysiloxane resin, or the like. In some examples, the adhesive 622 can be selected based on the selected housing and/or based on the chimney height and/or the FFL to achieve a desired gap between the flange 620 and the chimney 610 to help reduce the thickness of the adhesive 622 to help reduce shrinkage variation.

Figure 7:
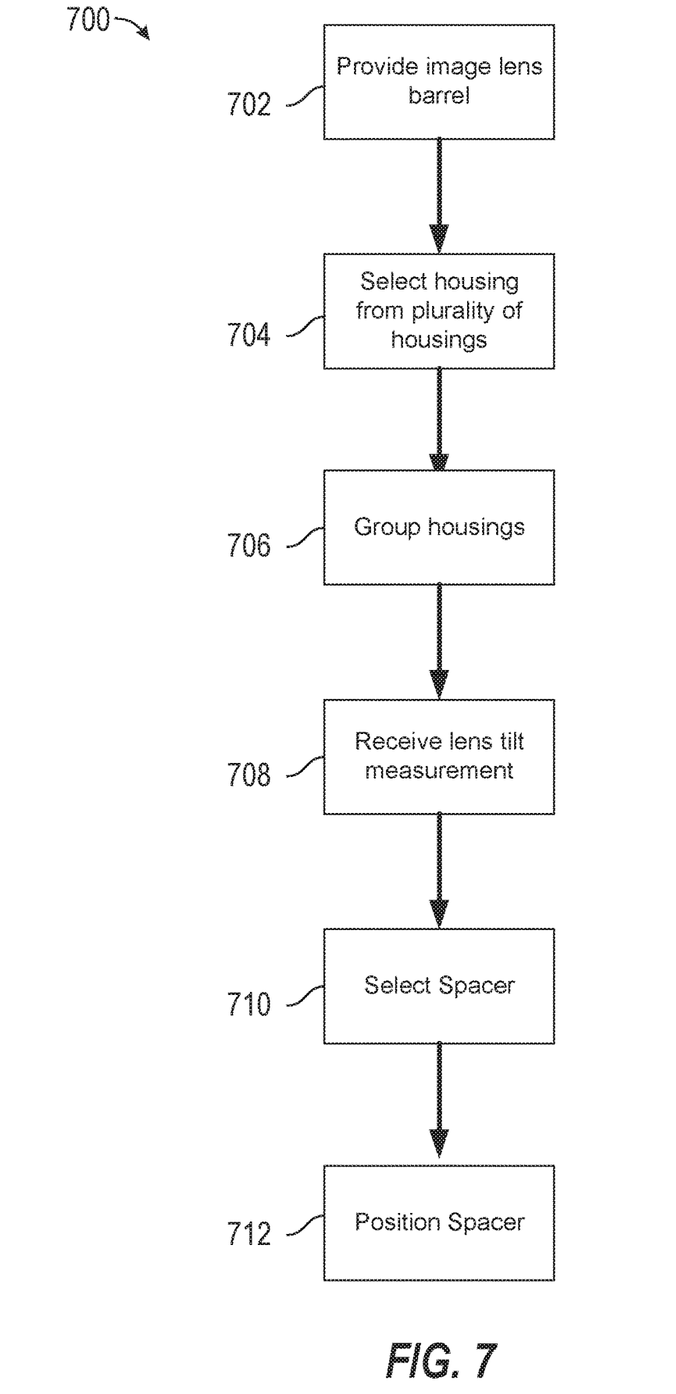
FIG. 7 is a block diagram representation of a method consistent with the disclosed embodiments.

The spacer 626 can be a rigid or semi-rigid member positionable between the distal end 614 of the chimney 610 and the flange 620 to adjust the gap between the distal end 614 of the chimney 610 and the flange 620. Controlling the gap between the distal end 614 of the chimney 610 and the flange 620 can help position the focal point on the image sensor and can help reduce the thickness of the adhesive 622 to help reduce shrinkage variation. In some examples, the spacer 626 can be selected based on the selected FFL FIG. 7 illustrates a schematic view of the method 700, in accordance with at least one example of this disclosure. The method 700 can be a method of assembling an image capture device. The steps or operations of the method 700 are illustrated in a particular order for convenience and clarity; many of the discussed operations can be performed in a different sequence or in parallel without materially impacting other operations. The method 700 as discussed includes operations performed by multiple different actors, devices, and/or systems. It is understood that subsets of the operations discussed in the method 700 can be attributable to a single actor, device, or system could be considered a separate standalone process or method.

The method can begin at step 702, where an imaging lens barrel can be provided, where the imaging lens barrel can include a barrel, a flange, and an optical element. The barrel can extend along a central axis. The flange can extend radially from the barrel. The optical element can be positioned on a distal end of the barrel, wherein a flange focal length (FFL) is associated with the optical element and flange together. At step 704, a housing can be selected from a plurality of housings, where each housing can include a chimney to support the flange. Each chimney can have a chimney height and the housing can be selected based on the chimney height and the FFL.

At step 706, each of the housings can be grouped into a plurality of housing groups based on the chimney height of each of the housings. The selection of the housing can include selecting the housing from a first housing group within the plurality of housing groups, where the first housing group can be associated with a specified range of chimney heights. Grouping of the housings into the plurality of housing groups can also be based on a housing manufacturer of each of the housings.

At step 708, a lens tilt measurement can be received, where the measurement can correspond to the imaging lens barrel and the selection of the housing can be based on the lens tilt measurement. At step 710, a spacer device can be selected based on the optical element FFL, wherein the spacer device can modify the housing chimney height.

In one example of step 712, the spacer can be positioned between the chimney and the flange to increase the chimney height. In another example of step 712, the spacer can be positioned between the housing and a sensor board to provide a modified chimney height. In another example, the image lens barrel can be selected from the plurality of image lens barrels based on the FFL and the chimney height.

Figure 8:
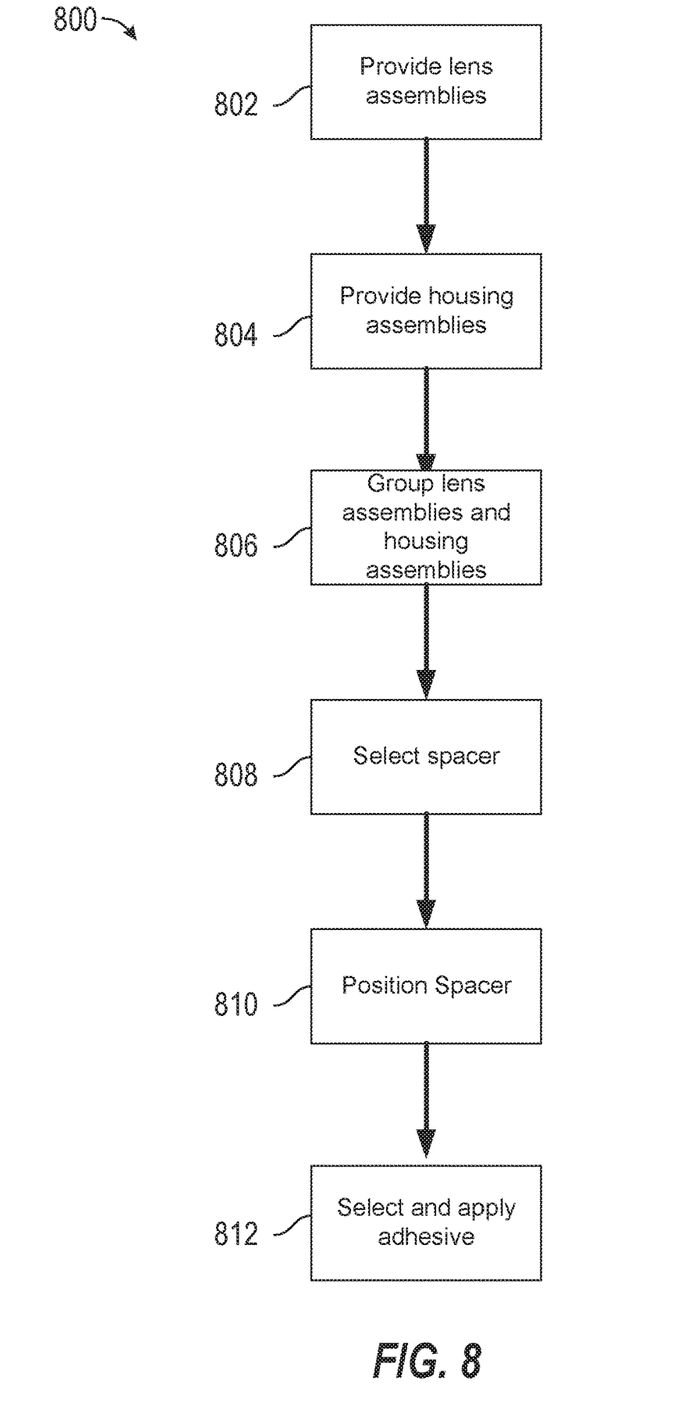
FIG. 8 is a block diagram representation of a method consistent with the disclosed embodiments.

FIG. 8 is a block diagram representation of a method 800 of assembling an image capture device consistent with the disclosed embodiments. Method 800 can begin at step 802 where a plurality of lens assemblies can be provided. Each lens assembly can include an optical element supported by a barrel and a flange extending from the barrel. A flange focal length (FFL) can be associated with the optical element and the flange together.

At step 804 a housing assembly can be provided from a plurality of housing assemblies, each housing assembly can include a chimney configured to support the flange and an image sensor attached to the housing. Each housing assembly can have a chimney height defined as a distance between a plane of the image sensor to an end plane of the chimney, the housing can be selected based on the chimney height and the FFL.

At step 806, the plurality of lens assemblies can be grouped into a plurality of lens assembly groups based on the FFL of each of the lens assemblies and the housing assemblies can be grouped into ty of housing assemblies groups based on the chimney height of each of the housing assemblies. In some examples, selection of the housing can include selecting the housing from a first housing group within the plurality of housing groups, where the first housing group can be associated with a specified chimney height.

At step 808, a spacer device can be selected based on the optical element FFL, wherein the spacer device can modify the housing chimney height. In one examples of step 810, the spacer can be positioned between the chimney and the flange to increase the chimney height. In another example, the spacer between the housing and a sensor board to increase the chimney height. At step 812, an adhesive can be selected based on the selection of the housing and the adhesive can be applied between the barrel flange and the chimney end. In some examples, the selection of the housing can also be based on a received lens tilt measurement.

To better illustrate the method and apparatuses disclosed herein, a non-limiting list of embodiments is provided here.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Any reference to a system should be applied mutatis mutandis to a method that is executed by a system and/or to a computer program product that stores instructions that once executed by the system will cause the system to execute the method. The computer program product is non-transitory and may be for example, an integrated circuit, a magnetic memory, an optical memory, a disk, and the like.

Any reference to method should be applied mutatis mutandis to a system that is configured to execute the method and/or to a computer program product that stores instructions that once executed by the system will cause the system to execute the method.

Any reference to a computer program product should be applied, mutatis mutandis to a method that is executed by a system and/or a system that is configured to execute the instructions stored in the computer program product.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component.

The terms "including," "comprising," "having," "consisting" and "consisting essentially of" are used in an interchangeable manner. For example any method may include at least the steps included in the figures and/or in the specification, only the steps included in the figures and/or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

Other modifications, variations and alternatives are also possible. The specifications and drawings are, accordingly, to be regarded in an illustrative rather than in a restrictive sense.

NOTES AND EXAMPLES

The following, non-limiting examples, detail certain aspects of the present subject matter to solve the challenges and provide the benefits discussed herein, among others.

Example 1 is an image capture system comprising: an imaging lens barrel comprising: a barrel extending along a central axis; a flange extending radially from the barrel; and an optical element positioned on a distal end of the barrel, wherein a flange focal length (FFL) is associated with the optical element and flange together; and a housing selected from a plurality of housings, each housing including a chimney to support the flange, each chimney having a chimney height, the housing selected based on the chimney height and the FFL.

In Example 2, the subject matter of Example 1 includes, wherein the housing is selected based on a lens tilt measurement corresponding to the imaging lens barrel.

In Example 3, the subject matter of Examples 1-2 includes, an adhesive applied between the barrel flange and the chimney end, the adhesive selected based on the selected housing.

In Example 4, the subject matter of Examples 1-3 includes, a spacer positioned between the chimney and the flange to increase the chimney height, the spacer selected based on the selected FFL.

In Example 5, the subject matter of Examples 1-4 includes, a spacer positioned between the between the housing and a sensor board to increase the chimney height, the spacer selected based on the selected FFL.

Example 6 is a method of assembling an image capture device, the method comprising: providing an imaging lens barrel comprising: a barrel extending along a central axis; a flange extending radially from the barrel; and an optical element positioned on a distal end of the barrel, wherein a flange focal length (FFL) is associated with the optical element and flange together; and selecting a housing from a plurality of housings, each housing including a chimney to support the flange, each chimney having a chimney height, the housing selected based on the chimney height and the FFL.

In Example 7, the subject matter of Example 6 includes, grouping each of the housings into a plurality of housing groups based on the chimney height of each of the housings; wherein the selection of the housing includes selecting the housing from a first housing group within the plurality of housing groups, the first housing group associated with a specified range of chimney heights.

In Example 8, the subject matter of Example 7 includes, wherein grouping of the housings into a plurality of housing groups is further based on a housing manufacturer of each of the housings.

In Example 9, the subject matter of Examples 6-8 includes, receiving a lens tilt measurement corresponding to the imaging lens barrel, wherein the selection of the housing is based on the lens tilt measurement.

In Example 10, the subject matter of Examples 6-9 includes, selecting a spacer device based on the optical element FFL, wherein the spacer device modifies the housing chimney height.

In Example 11, the subject matter of Example 10 includes, positioning the spacer between the chimney and the flange to increase the chimney height.

In Example 12, the subject matter of Examples 10-11 includes, positioning the spacer between the housing and a sensor board to provide a modified chimney height.

In Example 13, the subject matter of Examples 6-12 includes, selecting the image lens barrel from the plurality of image lens barrels based on the FFL and the chimney height.

Example 14 is a method of assembling an image capture device, the method comprising: providing a plurality of lens assemblies, each lens assembly including an optical element supported by a barrel and a flange extending from the barrel, wherein a flange focal length (FFL) is associated with the optical element and the flange together; and providing a housing assembly from a plurality of housing assemblies, each housing assembly including a chimney configured to support the flange and an image sensor attached to the housing, each housing assembly having a chimney height defined as a distance between a plane of the image sensor to an end plane of the chimney, the housing selected based on the chimney height and the FFL.

In Example 15, the subject matter of Example 14 includes, grouping each of the plurality of lens assemblies into a plurality of lens assembly groups based on the FFL of each of the lens assemblies; and grouping each of the housing assemblies into a plurality of housing assemblies groups based on the chimney height of each of the housing assemblies; wherein the selection of the housing includes selecting the housing from a first housing group within the plurality of housing groups, the first housing group associated with a specified chimney height.

In Example 16, the subject matter of Examples 14-15 includes, selecting a spacer device based on the optical element FFL, wherein the spacer device modifies the housing chimney height.

In Example 17, the subject matter of Example 16 includes, positioning the spacer between the chimney and the flange to increase the chimney height.

In Example 18, the subject matter of Examples 16-17 includes, positioning the spacer between the housing and a sensor board to increase the chimney height.

In Example 19, the subject matter of Examples 14-18 includes, selecting an adhesive based on the selection of the housing; and applying the adhesive between the barrel flange and the chimney end.

In Example 20, the subject matter of Examples 14-19 includes, wherein the selection of the housing is further based on a received lens tilt measurement.

Example 21 is an image capture device comprising: an image capture device housing; an image capture device lens disposed partially within the image capture device housing, the image capture device housing selected based on an image capture device flange focal distance; and an adhesive disposed between the image capture device lens and the image capture device housing, the adhesive separating the image capture device lens from the image capture device housing by an adhesive displacement thickness, the adhesive displacement thickness selected based on an active alignment of the image capture device lens.

In Example 22, the subject flatter of Example 21 includes, wherein the housing is selected based on a lens tilt measurement corresponding to the imaging lens barrel.

In Example 23, the subject matter of Examples 21-22 includes, a spacer positioned between the chimney and the flange to increase the chimney height, the spacer selected based on the selected FFL.

In Example 24, the subject matter of Examples 21-23 includes, a spacer positioned between the between the housing and a sensor board to increase the chimney height, the spacer selected based on the selected FFL.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

In Example 29, the apparatuses or method of any one or any combination of Examples 1-28 can optionally be configured such that all elements or options recited are available to use or select from.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of system that is illustrated in any of the figures and/or specification and/or the claims may be provided. Any combination of any system illustrated in any of the figures and/or specification and/or the claims may be provided. Any combination of steps, operations and/or methods illustrated in any of the figures and/or specification and/or the claims may be provided. Any combination of operations illustrated in any of the figures and/or specification and/or the claims may be provided. Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

The invention claimed is:

1. An image capture system comprising:
    an imaging lens barrel comprising:
        a barrel extending along a central axis;
        a flange extending radially from the barrel; and
        an optical element positioned on a distal end of the barrel, wherein a flange focal length (FFL) is associated with the optical element and flange together; and
    a housing selected from a plurality of housings, each housing including a chimney to support the flange, each chimney having a chimney height, the housing selected based on the chimney height and the FFL, such that a relatively small imaging lens barrel is paired with a housing including a relatively large chimney or such that a relatively large imaging lens barrel is paired with the housing including a relatively small chimney so that an adhesive gap of both pair types is within a desired size range.

2. The system of claim 1, wherein the housing is selected based on a lens tilt measurement corresponding to the imaging lens barrel.

3. The system of claim 1, further comprising:
    an adhesive applied between the barrel flange and the chimney end, the adhesive selected based on the selected housing.

4. The system of claim 1, further comprising:
    a spacer positioned between the chimney and the flange to increase the chimney height, the spacer selected based on the selected FFL.

5. The system of claim 1, further comprising:
    a spacer positioned between the between the housing and a sensor board to increase the chimney height, the spacer selected based on the selected FFL.

6. A method of assembling an image capture device, the method comprising:
    providing an imaging lens barrel comprising:
        a barrel extending along a central axis;
        a flange extending radially from the barrel; and
        an optical element positioned on a distal end of the barrel, wherein a flange focal length (FFL) is associated with the optical element and flange together; and
    selecting a housing from a plurality of housings, each housing including a chimney to support the flange, each chimney having a chimney height, the housing selected based on the chimney height and the FFL, such that relatively small imaging lens barrels are paired with housings including relatively large chimneys and such that relatively large imaging lens barrels are paired with housings including relatively small chimneys so that an adhesive gap of both of types of pairs are within a desired size range.

7. The method of claim 6, further including:
grouping each of the housings into a plurality of housing groups based on the chimney height of each of the housings;
wherein the selection of the housing includes selecting the housing from a first housing group within the plurality of housing groups, the first housing group associated with a specified range of chimney heights.

8. The method of claim 7, wherein grouping of the housings into a plurality of housing groups is further based on a housing manufacturer of each of the housings.

9. The method of claim 6, further comprising:
receiving a lens tilt measurement corresponding to the imaging lens barrel, wherein the selection of the housing is based on the lens tilt measurement.

10. The method of claim 6, further comprising:
selecting a spacer device based on the optical element FFL, wherein the spacer device modifies the housing chimney height.

11. The method of claim 10, further comprising:
positioning the spacer device between the chimney and the flange to increase the chimney height.

12. The method of claim 10, further comprising:
positioning the spacer device between the housing and a sensor board to provide a modified chimney height.

13. The method of claim 6, further comprising:
selecting the image lens barrel from the plurality of image lens barrels based on the FFL and the chimney height.

14. A method of assembling an image capture device, the method comprising:
providing a plurality of lens assemblies, each lens assembly including an optical element supported by a barrel and a flange extending from the barrel, wherein a flange focal length (FFL) is associated with the optical element and the flange together; and
providing a housing assembly from a plurality of housing assemblies, each housing assembly including a chimney configured to support the flange and an image sensor attached to the housing, each housing assembly having a chimney height defined as a distance between a plane of the image sensor to an end plane of the chimney, the housing selected based on the chimney height and the FFL, such that relatively small imaging lens barrels are paired with housings including relatively large chimneys and such that relatively large imaging lens barrels are paired with housings including relatively small chimneys so that an adhesive gap of both types of pairs are within a desired size range.

15. The method of claim 14, further including:
grouping each of the plurality of lens assemblies into a plurality of lens assembly groups based on the FFL of each of the lens assemblies; and
grouping each of the housing assemblies into a plurality of housing assemblies groups based on the chimney height of each of the housing assemblies;
wherein the selection of the housing includes selecting the housing from a first housing group within the plurality of housing groups, the first housing group associated with a specified chimney height.

16. The method of claim 14, further comprising:
selecting a spacer device based on the optical element FFL, wherein the spacer device modifies the housing chimney height.

17. The method of claim 16, further comprising:
positioning the spacer device between the chimney and the flange to increase the chimney height.

18. The method of claim 16, further comprising:
positioning the spacer device between the housing and a sensor board to increase the chimney height.

19. The method of claim 14, further comprising:
selecting an adhesive based on the selection of the housing; and
applying the adhesive between the barrel flange and the chimney end.

20. The method of claim 14, wherein the selection of the housing is further based on a received lens tilt measurement.

* * * * *